United States Patent [19]

Cavitt et al.

[11] Patent Number: 4,755,542
[45] Date of Patent: Jul. 5, 1988

[54] FLEXIBLE THERMOPLASTIC EPOXY RESIN AND COATINGS PREPARED THEREFROM

[75] Inventors: Michael B. Cavitt, Lake Jackson; David J. Duncan, Freeport, both of Tex.

[73] Assignee: The Dow Chemical Company, Midland, Mich.

[21] Appl. No.: 24,748

[22] Filed: Mar. 11, 1987

[51] Int. Cl.$^4$ .......................... F21D 7/22; C08L 63/10
[52] U.S. Cl. ..................................... 523/172; 523/427; 523/428; 523/466; 525/109; 525/115; 525/122; 525/488; 525/524; 525/525; 525/530
[58] Field of Search ......................... 523/172, 427, 428; 525/524, 109, 115, 488, 530, 525

[56] References Cited

U.S. PATENT DOCUMENTS

| | | | |
|---|---|---|---|
| 2,639,500 | 5/1953 | Muny et al. | 30/443 |
| 3,326,741 | 6/1967 | Olson | 428/335 |
| 3,356,624 | 12/1967 | Deal | 523/427 |
| 3,509,230 | 4/1970 | Clarke | 525/119 |
| 3,678,130 | 7/1972 | Klapprott et al. | 525/109 |
| 3,678,131 | 7/1972 | Klapprott et al. | 525/109 |
| 3,706,684 | 12/1972 | Lopez | 525/524 |
| 3,707,583 | 12/1972 | McKown | 427/27 |
| 3,787,349 | 1/1974 | Eliasson et al. | 523/427 |
| 3,873,638 | 3/1975 | Olson | 525/262 |
| 3,926,904 | 12/1975 | Soola | 525/524 |
| 3,947,522 | 3/1976 | Shelley, Jr. et al. | 525/113 |
| 4,203,878 | 5/1980 | Bauer | 523/172 |
| 4,296,006 | 10/1981 | Bugdahl et al. | 523/172 |
| 4,500,660 | 2/1985 | Miramisawa et al | 523/428 |
| 4,632,971 | 12/1986 | Cavitt | 528/88 |

FOREIGN PATENT DOCUMENTS 8500610 2/1985 European Pat. Off. .

OTHER PUBLICATIONS

Development of Lane Delineation with Improved Durability, J. M. Dale, Federal Highway Administration, Rept. No. FHWA-RD-75-70, Jul. 1975.

*Primary Examiner*—John C. Bleutge
*Assistant Examiner*—David W. Woodward

[57] ABSTRACT

Flexible thermoplastic epoxy resins are prepared by reacting (1) an advanced epoxy resin prepared by reacting a mixture of an aromatic based epoxy resin and an aliphatic based epoxy resin with a polyhydric phenol in the presence of an advancement catalyst with (2) a monocarboxylic acid or anhydride thereof; reacting the resultant product with a mixture of an aromatic based epoxy resin and a monofunctional material reactive with vicinal epoxy groups; and reacting the resultant product with a carboxyl terminated elastomer. These resins are particularly useful in formulating pavement marking paints.

33 Claims, No Drawings

FLEXIBLE THERMOPLASTIC EPOXY RESIN AND COATINGS PREPARED THEREFROM

FIELD OF THE INVENTION

The present invention pertains to thermoplastic epoxy resins and coatings prepared therefrom.

BACKGROUND OF THE INVENTION

Thermoplastic (non-thermoset) epoxy resins have been employed in the formulation of highway pavement marking paints as disclosed by J. M. Dale in *"Development of Lane Deliniation With Improved Durability"*, Report No. FHWA-RD-75-70, July 1975 available from U S. Dept. of Trans. Off. of Dev., Federal Hwy. Adms., Wash. D.C., 20590. The paint formulations are maintained at elevated temperatures, usually 450° F. to 500° F., during application. While they provide an excellent highway marking paint in terms of abrasive resistance, they are deficient in terms of applicability since they exhibit a substantial increase in viscosity while being maintained at the application temperature. Even if the thermoplastic epoxy resins could maintain it's viscosity, the resulting thermoplastic epoxy resins do not have the necessary flexibility to allow wide-spread It would be desirable to have a thermoplastic (non-thermoset) epoxy resin which exhibits a much reduced viscosity increase at elevated temperatures, i.e. it is more thermally stable and exhibits improved flexibility over those thermoplastic epoxy resins disclosed by J. M. Dale. It is desirable that the flexibility of the formulated thermoplastic resin for use in highway marking paints be at least about 15 percent.

SUMMARY OF THE INVENTION

The present invention pertains to a thermally stable, flexible thermoplastic epoxy resin resulting from (A) reacting, in the presence of an effective quantity of a catalyst for effecting the reaction between a vicinal epoxide group and an aromatic hydroxyl group, a mixture comprising
  (1) at least one aromatic based epoxy resin having an average of more than 1 but not more than about 2.1 vicinal epoxy groups per molecule:
  (2) at least one aliphatic based epoxy resin having an average of more than 1 but not more than about 2.1 vicinal epoxy groups per molecule:
  (3) at least one material having an average of more than 1 but not more than about 2 phenolic hydroxyl groups per molecule;
wherein components (1) and (2) are employed in quantities such that from about 90 to about 99.6, suitably from about 94 to about 99.6, more suitably from about 96 to about 99.6, percent of the vicinal epoxy groups are contributed by the aromatic based epoxy resin and from about 10 to about 0.4, suitably from about 6 to about 0.4, more suitably from about 4 to about 0.4, percent of the vicinal epoxy groups are contributed by the aliphatic based epoxy resin; and wherein component (3) is employed in quantities such that the resultant product has an epoxide equivalent weight (EEW) of from about 1600 to about 2500, suitably from about 1650 to about 2100, more suitably from about 1700 to about 1900, calculated on the basis that the aromatic groups contained therein are free of substituent groups even if they do in fact contain substituent groups:

(B) reacting, in the presence of an effective quantity of a catalyst for effecting the reaction between a vicinal epoxide group and a carboxyl group, the product resulting from (A) with
  (4) at least one aromatic or aliphatic monocarboxylic acid in a quantity which provides a ratio of moles of component (4) per epoxide group contained in component (1) of from about 0.033:1 to about 0.2:1, suitably from about 0.037:1 to about 0.1:1, more suitably from about 0.038:1 to about 0.07:1;

(C) reacting, in the presence of an effective quantity of a catalyst for effecting the reaction between a vicinal epoxide group and a group selected from —OH, —SH, —COOH and —CO—O—CO— groups, the product resulting from (B) with a mixture comprising
  (5) an aromatic based epoxy resin having an average of more than 1 but not more than about 2.1 vicinal epoxy groups per molecule and an EEW of not greater than about 225, suitably not greater than about 200, more suitably not greater than about 195, calculated on the basis of the aromatic groups being free of substituent groups whether or not they do in fact contain substituent groups; and
  (6) a reactant material having only one group per molecule which is reactive with a vicinal epoxy group selected from —OH, —SH, —COOH and —CO—O—CO—groups:
wherein component (5) is employed in an amount which provides a ratio of vicinal epoxy groups from component (5) to the combined amount epoxy groups contained in components (1) and (2) of from about 0.42:1 to about 0.48:1, suitably from about 0.43:1 to about 0.47:1, more suitably from about 0.44:1 to about 0.46:1; and component (6) is employed in an amount which provides from about 0.87 to about 1, suitably from about 0.96 to about 1, more suitably from about 0.98 to about 1, group reactive with a vicinal epoxy group per combined vicinal epoxy group contained in the product from (B) and component (5); and (D) reacting, in the presence of an effective quantity of a catalyst for effecting the reaction between a vicinal epoxide group and a carboxyl group, the product resulting from (C) with
  (7) a carboxyl terminated elastomer in an amount which provides a ratio of carboxyl groups to combined vicinal epoxy groups contained in components (1) and (2) of from about 0.0028:1 to about 0.03:1, suitably from about 0.003:1 to about 0.009:1, more suitably from about 0.0035:1 to about 0.008:1:
with the proviso that (a) the combined quantity of groups reactive with an epoxide group from components (3), (4), (6) and (7) cannot exceed the combined quantity of epoxide groups contained in components (1), (2) and (5) and (b) if step (C) is not performed, then step (D) is conducted employing the product from step (B) instead of that from step (C).

Another aspect of the present invention pertains to a mixture comprising
  (I) from about 70 to about 95, suitably from about 80 to about 95, more suitably from about 84 to about 94 percent by weight based upon the combined weight of components (I) and (II) of a thermally stable, flexible thermoplastic epoxy resin resulting from
    (A) reacting, in the presence of an effective quantity of a catalyst for effecting the reaction between a vicinal epoxide group and an aromatic hydroxyl group, a mixture comprising (1) at least one aromatic based epoxy resin having an average of more than 1 but not more than about 2.1 vicinal epoxy groups per molecule:
(2) at least one aliphatic based epoxy resin having an average of more than 1 but not more than about 2.1 vicinal epoxy groups per molecule:
(3) at least one material having an average of more than 1 but not more than about 2 phenolic hydroxyl groups per molecule;

wherein components (1) and (2) are employed in quantities such that from about 90 to about 99.6, suitably from about 94 to about 99.6, more suitably from about 96 to about 99.6, percent of the vicinal epoxy groups are contributed by the aromatic based epoxy resin and from about 10 to about 0.4, suitably from about 6 to about 0.4, more suitably from about 4 to about 0.4, percent of the vicinal epoxy groups are contributed by the aliphatic based epoxy resin; and wherein component (3) is employed in quantities such that the resultant product has an EEW of from about 1600 to about 2500, suitably from about 1650 to about 2100, more suitably from about 1700 to about 1900, calculated on the basis that the aromatic groups contained therein are free of substituent groups even if they do in fact contain substituent groups;

(B) reacting, in the presence of an effective quantity of a catalyst for effecting the reaction between a vicinal epoxide group and a carboxyl group, the product resulting from (A) with
(4) at least one aromatic or aliphatic monocarboxylic acid in a quantity which provides a ratio of moles of component (4) per epoxide group contained in component (1) of from about 0.033:1 to about 0.2:1, suitably from about 0.037:1 to about 0.1:1, more suitably from about 0.038:1 to about 0.07:1;

(C) reacting, in the presence of an effective quantity of a catalyst for effecting the reaction between a vicinal epoxide group and a group selected from —OH, —SH, —COOH and —CO—O—CO— groups, the product resulting from (B) with a mixture comprising
(5) an aromatic based epoxy resin having an average of more than 1 but not more than about 2.1 vicinal epoxy groups per molecule and an EEW of not greater than about 225, suitably not greater than about 200, more suitably not greater than about 195, calculated on the basis of the aromatic groups being free of substituent groups whether or not they do in fact contain substituent groups: and
(6) at least one reactive material having only one group per molecule which is reactive with a vicinal epoxy group selected from —OH, —SH, —COOH and —CO—O—CO— groups;

wherein component (5) is employed in an amount which provides a ratio of vicinal epoxy groups from component (5) to vicinal epoxy groups from components (1) and (2) of from about 0.42:1 to about 0.48:1, suitably from about 0.43:1 to about 0.47:1, more suitably from about 0.44:1 to about 0.46:1: and component (6) is employed in an amount which provides from about 0.87 to about 1, suitably from about 0.96 to about 1, more suitably from about 0.98 to about 1, group reactive with a vicinal epoxy group per combined vicinal epoxy group contained in the product from (B) and component (5); and (D) reacting, in the presence of an effective quantity of a catalyst for effecting the reaction between a vicinal epoxide group and a carboxyl group, the product resulting from (C) with
(7) at least one carboxyl terminated elastomer in an amount which provides a ratio of carboxyl groups to vicinal epoxy groups contained in components (1) and (2) of from about 0.0028:1 to about 0.03:1, suitably from about 0.003:1 to about 0.009:1, more suitably from about 0.0035:1 to about 0.008:1;

with the proviso that (a) the combined quantity of groups reactive with an epoxide group from components (3), (4), (6) and (7) cannot exceed the quantity of epoxide groups contained in components (1), (2) and (5) and (b) if step (C) is not performed, then step (D) is conducted employing the product from step (B) instead of that from step (C); and (II) from about 5 to about 30, suitably from about to about 20, more suitably from about 6 to about 16 percent by weight based upon the ombined weight of components (1) and (II) of the product resulting from reacting, in the presence of an effective quantity of a catalyst for effecting the reaction between a vicinal epoxide group and a group selected from —OH, —SH, —COOH and —CO—O—CO— groups,
(8) at least one aromatic based epoxy resin having an average of more than 1 but not more than about 2.1 vicinal epoxy groups per molecule and an EEW of not greater than about 225, suitably not greater than about 200, more suitably not greater than about 195 calculated on the basis of the aromatic groups being free of substituent groups whether or not they do in fact contain substituent groups: and
(9) at least one reactant material having only one group per molecule which is reactive with a vicinal epoxy group selected from —OH, —SH, —COOH and —CO—O—CO— groups: and wherein components (8) and (9) are employed in an amount which provides a ratio of groups reactive with a vicinal epoxy group to vicinal epoxy group of from about 0.9:1 to about 1.1:1, suitably from about 0.94:1 to about 1:1, more suitably from about 0.96:1 to about 1:1.

A further aspect of the present invention pertains to an essentially solvent-free paint formulation comprising the aforementioned mixture of components (I) and (II) and at least one of (A) at least one pigment or dye or combination thereof: or (B) (1) at least one filler material; (2) at least one light reflective material; or (3) a combination of (1) and (2). In these essentially solvent-free paint formulations, the aforementioned compositions require that step (C) be conducted.

Still another aspect of the present invention pertains to a solvent based paint comprising the aforementioned paint formulation and one or more inert solvent materials. In these solvent containing paint formulations, steps (I-C) and step (II) are optional in the preparation of the aforementioned compositions employed in the paint formulation.

The present invention provides thermplastic epoxy resin formulations suitable for use in highway marking paints which are thermally stable and which have good flexibility.

DETAILED DESCRIPTION OF THE INVENTION

The reaction enumerated in step (A) involving the mixture of the aromatic epoxy resin and aliphatic epoxy resin and the aromatic hydroxyl-containing material can be conducted at any temperature between about 150° C. and 225° C., usually between about 175° C. and 200° C. for a time sufficient to complete the reaction, usually between about 0.5 and about 3 hours, more usually between about 1 and about 2 hours. Higher temperatures require shorter reaction times to reach the same level of reaction, while lower temperatures require longer reaction times to reach the same level of reaction. In this reaction, in order to prepare a product having the desired equivalent weight, components (1), (2) and (3), are usually employed in amounts which provide a ratio of phenolic hydroxyl groups from component (3) to vicinal epoxide groups contained in components (1) and (2) of from about 0.8:1 to about 0.9:1, suitably from about 0.81:1 to about 0.87:1, more suitably from about 0.82:1 to about 0.85:1.

When the amount of epoxide groups contributed by the aromatic based epoxy resin is less than about 90 percent, the resultant formulated paint may become tacky when applied to highway surfaces in warm climates thereby resulting in the loss of paint visibility.

When the amount of epoxide groups contributed by the aromatic based epoxy resin is greater than about 99.6 percent, the resulting formulated paint will decrease in flexibility and have a shorter service life for highway lane delineation.

When the EEW of the product produced in step (A) (the product resulting from the reaction of an aromatic epoxy resin and aliphatic epoxy resin and an aromatic hydroxyl-containing material), is less than about 1600, the resulting formulated paint will become tacky and tend to discolor due to highway traffic. This tendency is more predominant when the formulated paint is applied in warmer climates or in the summer time in colder climates.

When the EEW of the product produced in step (1-A) (the product resulting from the reaction of an aromatic epoxy resin and aliphatic epoxy resin and an aromatic hydroxyl-containing material) is greater than about 2500, the resulting formulated paint will become difficult to apply with conventional spray equipment which is currently employed.

The reaction enumerated in step (B) (the reaction between the product produced in step (A) and the aromatic or aliphatic monocarboxylic acid) can be conducted at any temperature between about 120° C. and 190° C., usually between about 150° C. and 190° C. for a time sufficient to complete the reaction, more usually between about 0.25 and about 0.6 hours, usually between about 0.3 and about 0.5 hours. Higher temperatures require shorter reaction times to reach the same level of reaction. At temperatures below about 120° C., undesirably long reaction times are required to complete the reaction and mechanical problems result with the reaction equipment due to high viscosity of the reaction mixture.

At temperatures above about 190° C., undesired side reactions may take place which could lead to undesirable high viscosity in the formulated paint.

In this reaction, in order to prepare a product having the desired equivalent weight, component (4) is usually employed in an amount which provides a ratio of aromatic or aliphatic carboxyl groups from component (4) to vicinal epoxide groups contained in component (1) of from about 0.033:1 to about 0.2:1, suitably from about 0.037:1 to about 0.1:1, more suitably from about 0.038:1 to about 0.07:1.

The reaction enumerated in step (C), (the reaction between the product produced in step (B) and the aromatic based epoxy resin and the material having a group reactive with an epoxy group), can be conducted at any temperature between about 150° C. and 210° C., usually between about 175° C. and 200° C. for a time sufficient to complete the reaction, usually between about 1 and about 4 hours, more usually between about 1.5 and about 2 hours. Higher temperatures require shorter reaction times to reach the same level of reaction, while lower temperatures require longer reaction times to reach the same level of reaction. At temperatures below about 150° C., the viscosity becomes too high for effective agitation in conventional equipment.

At temperatures above about 210° C., undesired side reactions may take place which could lead to high viscosity in the formulated paint.

The reaction enumerated in step (D) involving the reaction between the product produced in step (C) and the carboxyl terminated elastomer can be conducted at any temperature between about 150° C. and 210° C., usually between about 175° C. and 190° C. for a time sufficient to complete the reaction, usually between about 1 and about 3 hours, more usually between about 1 and about 2 hours. Higher temperatures require shorter reaction times to reach the same level of reaction, while lower temperatures require longer reaction times to reach the same level of reaction. At temperatures below about 150° C., the viscosity becomes too high for effective agitation in conventional reaction equipment.

At temperatures above about 210° C., undesirable side reactions may take place which could lead to high viscosity in the formulated paint.

The reaction between components (8) and (9) in component (11) of the paint formulation involving the reaction between an aromatic based epoxy resin and material containing groups reactive with an epoxy resin can be conducted at any temperature between about 150° C. and 210° C., usually between about 175° C. and 200° C. for a time sufficient to complete the reaction, usually between about 1 and about 4 hours, more usually between about 1 and about 3 hours. Higher temperatures require shorter reaction times to reach the same level of reaction, while lower temperatures require longer reaction times to reach the same level of reaction. At temperatures below about 150° C., the viscosity becomes too high for effective agitation in conventional reaction equipment.

At temperatures above about 210° C., undesirable side reactions may take place which could lead to high viscosity in the formulated paint.

The amount of catalyst employed depends upon the particular components which are being reacted together. However, usually, the catalyst is employed in amounts which correspond to from about 0.0004 to about 0.002, more usually from about 0.0005 to about 0.001, most usually from about 0.0006 to about 0.0009, mole of catalyst per epoxy group contained in the reaction mixture. At catalyst amounts below about 0.0004 mole per epoxy group, the reaction rate becomes very slow and if the catalyst amount is very low, the reaction may be incomplete.

At catalyst amounts above about 0.002 mole per epoxy group, the reaction rate can become so great that the energy of the reaction cannot be removed fast enough to stop side reactions that could lead to gellation.

Suitable aromatic based epoxy resins which can be employed herein include, for example, but are not limited to those represented by the following Formula I

FORMULA I

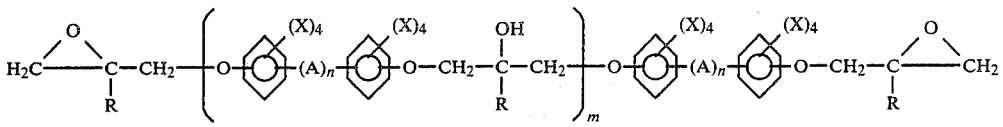

wherein each A is a divalent hydrocarbyl group having from 1 to about 12, preferably from 1 to about 6 carbon atoms, —SO—, —SO$_2$—, —O—, or —CO—; each R is independently hydrogen or a hydrocarbyl group having from 1 to about 4, preferably from 1 to about 2 carbon atoms: each X is independently hydrogen, a hydrocarbyl or hydrocarbyloxy group having from 1 to about 8, preferably from 1 to about 4, carbon atoms, or a halogen, preferably chlorine or bromine; m has an average value from about zero to about 0.5; and n has a value of zero or 1.

Particularly suitable aromatic based epoxy resins include, for example, the diglycidyl ethers of bisphenols such as, for example, the diglycidyl ether of biphenol, the diglycidyl ether of bisphenol A, the diglycidyl ether of bisphenol F, combinations thereof and the like.

The term hydrocarbyl as employed herein means any aliphatic, cycloaliphatic, aromatic, aryl substituted aliphatic or cycloaliphatic group, or aliphatic or cycloaliphatic substituted aromatic group. Likewise, the term hydrocarbyloxy means a hydrocarbyl group having an oxygen linkage between it and the object to which it is attached.

Suitable aliphatic based epoxy resins which can be employed herein include, for example, glycidyl ethers of polyhydroxyl-containing aliphatic compounds. Suitable such aliphatic based epoxy resins include, for example, but not limited to those represented by the following Formulas II and III.

FORMULA II

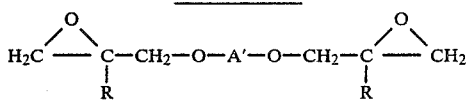

FORMULA III

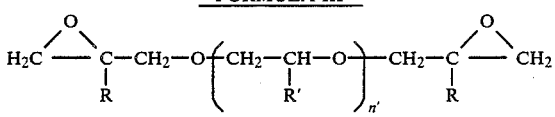

wherein A' is a divalent aliphatic hydrocarbyl group having from 2 to about 12 carbon atoms; R is as defined above; R' is an alkyl group having from 1 to about 6 carbon atoms and n' has an average value from 1 to about 15 suitably from about 1 to about 10. Particularly suitable aliphatic based epoxy resins include, for example, the diglycidyl ethers of polyoxyalkylene compounds such as, for example, the diglycidyl ether of dipropylene glycol, the diglycidyl ether of polyoxypropylene glycol having from about 2 to about 15 oxypropylene groups, the diglycidyl ether of polyoxybutylene glycol having from about 2 to about 10 oxybutylene groups, combinations thereof and the like.

Suitable materials containing an average of more than one aromatic hydroxyl groups which can be employed herein include, for example, but not limited to those represented by the following Formula IV

FORMULA IV

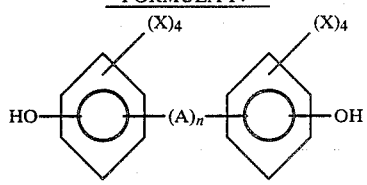

wherein A, X and n are as defined above.

Suitable aliphatic or aromatic monocarboxylic acids which can be employed herein include, for example, those having from about 2 to about 24, suitably from about 8 to about 20, more suitably from about 12 to about 18, carbon atoms. The aliphatic or aromatic carboxylic acids may also contain in addition to the carboxyl group, other groups which are not reactive with either an aliphatic hydroxyl group or an epoxy group such as, for example, halogen atoms, alkyl or alkyoxy groups, and the like. Particularly suitable monocarboxylic acids include, for example, acetic acid, propionic acid, butyric acid, valeric acid, caproic acid, caprylic acid, capric acid, lauric acid, myristic acid, palmitic acid, stearic acid, oleic acid, phenylacetic acid, toluic acid, combinations thereof and the like.

Suitable anhydrides of monocarboxylic acids, those materials containing a —CO—O—CO— group which can be employed herein include, the anhydrides of the aforementioned monocarboxylic acids.

Suitable materials having only one —OH group per molecule which can be employed herein include, for example, monohydric aliphatic and aromatic alcohols which may be substituted with any group which does not react with an aliphatic or aromatic hydroxyl group or with an epoxide group, such as, for example, halogen atoms, alkyl or alkyoxy groups, and the like. Particularly suitable monohydric alcohols include, for example, methanol, ethanol, propanol, isopropanol, butanol, pentanol, hexanol, ethylene glycol monomethyl ether, propylene glycol monomethyl ether, ethylene glycol monoethyl ether, propylene glycol monoethyl ether, combinations thereof and the like. Particularly suitable monohydric aromatic alcohols include, for example phenol, alkylphenols, such as, for example, nonylphenol, t-butylphenol, cresol, combinations thereof and the like.

Suitable thiols, materials containing an —SH group, which can be employed herein include, for example, hydrogen sulfide, thiopropane, thiopentane, combinations thereof and the like.

Suitable elastomer materials which can be employed herein include, for example, any elastomeric material which is terminated in carboxyl groups. Particularly suitable elastomer materials include, for example butadiene-acrylonitrile copolymers which are terminated in carboxyl groups. Particularly suitable are the carboxyl terminated butadiene-acrylonitrile copolymers containing from about 20 to about 25 percent by weight acrylonitrile and from about 75 to about 80 percent by weight butadiene based on the weight of acrylonitrile and butadiene. The carboxyl terminated butadiene-acrylonitrile copolymers have carboxyl contents of from about 1.7 to about 3 percent by weight based upon total weight of the carboxyl-containing polymer.

Suitable catalysts for effecting the reaction between the epoxy resin, the phenolic hydroxylcontaining materials and monocarboxylic acids or monohydric alcohols or anhydrides of monocarboxylic acids include, for example, those disclosed in U.S. Pat. Nos. 3,306,872; 3,341,580; 3,379,684; 3,477,990; 3,547,881; 3,948,855; 4,048,141; 4,093,650; 4,131,633; 4,132,706; 4,171,420; 4,177,216; 4,302,574; 4,320,222; 4,366,295 and 4,389,520 all of which are incorporated herein by reference.

Particularly suitable catalysts are those quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate.acetic acid complex), tetrabutylphosphonium chloride, tetrabutylphosphonium bromide, tetrabutylphosphonium iodide, tetrabutylphosphonium acetate, tetrabutylphosphonium diacetate (tetrabutylphosphonium acetate.acetic acid complex), butyltriphenylphosphonium tetrabromobisphenate, butyltriphenylphosphonium bicarbonate, benzyltrimethylammonium chloride and tetramethylammonium hydroxide, combinations thereof and the like.

Suitable pigments, dyes or other colorants which can be employed herein include, any of those which will provide the coating or paint with the desired color, such as for example, titanium dioxide, lead chromate, zinc chromate, chrome green, pthalocyamine green and blue, iron oxide, combinations thereof and the like. These pigments or colorants are employed in quantities which provide the composition with the desired color which will depend upon the particular paint formulation as well as the particular pigment or colorant being employed. Suitable amounts of pigments or colorants or combinations thereof include, for example from about 5 to about 25, suitably from about 10 to about 23, more sutitably from about 12 to about 20 parts by weight based upon the amount of non-volitile components employed in the paint or coating formulation.

Suitable fillers which can be employed herein include, for example, calcium carbonate, talc, powdered or flaked zinc or alumina, powdered or flaked glass, titanium dioxide, colloidal silica, combinations thereof and the like. The fillers are usually employed in quantities of from about 5 to about 30, suitably from about 5 to about 27, more suitably from about 5 to about 25, percent by weight based upon the weight of the total formulation.

Suitable light reflective materials which can be employed herein include, for example, glass beads, glass flakes, glass fibers, glass bubbles, combinations thereof and the like. The light reflective materials are usually employed in quantities of from about 10 to about 40, suitably from about 13 to about 40, more suitably from about 15 to about 37, percent by weight based upon the weight of the total formulation.

Suitable solvents which can be employed herein to prepare solvent borne coatings or paints include, for example, ketones, aromatic hydrocarbons, combinations thereof and the like. Particularly suitable solvents include, for example, acetone, methyl ethyl ketone, methyl isobutyl ketone, cyclohexane, methylene chloride, combinations thereof and the like. These solvents, when employed, are employed in quantities which provide the compositions with the desired application viscosity, usually in amounts from about 10 to about 50, suitably from about 15 to about 40, more suitably from about 20 to about 35 based upon total paint or coating formulation including the solvent.

The following examples are illustrative of the invention but are not to be construed as to limiting the scope thereof.

MATERIALS EMPLOYED IN THE EXAMPLES AND COMPARATIVE EXPERIMENTS

EPOXY RESIN A is the diglycidyl ether of bisphenol A having an epoxide equivalent weight (EEW) of 188.

EPOXY RESIN B is the diglycidyl ether of bisphenol A having an EEW of 189.

EPOXY RESIN C is the diglycidyl ether of bisphenol A having an EEW of 188.6.

EPOXY RESIN D is the diglycidyl ether of polypropylene glycol having a weight averge molecular weight of 425. The resultant epoxy resin had an EEW of 300.

CATALYST A is a 70 weight percent solution of ethyltriphenylphosphonium acetate.acetic acid complex in methanol.

CATALYST B is a 70 weight percent solution of tetra-n-butylphosphonium acetate.acetic acid complex in methanol.

ELASTOMER A is a carboxyl terminated acrylonitrile-butadiene rubber containing 18 weight percent acrylonitrile and 80 weight percent butadiene and having a carboxyl equivalent weight of 2000. This material is commercially available from B. F. Goodrich as HYCAR ™ CTBN 1300X8.

FILLER A is a mixture containing 29.4 parts by weight (pbw) titanium dioxide, 29.4 pbw calcium carbonate and 41.2 pbw 200 mesh (U. S. Standard Sieve Series) glass beads.

THICKNER A is THIXATROL ™ ST commercially available from NL Chemicals.

DESCRIPTION OF TESTS

FLEXIBILITY

The flexibility is determined by pressing out a thin film, 15–25 mils (0.381–0.635 mm) thick, between plastic sheets at a temperature of about 200° C. After cooling overnight 0.8–1 cm×6–8 cm specimens were cut from the film. The coupons were then placed between the jaws of a caliper. The jaws were then moved toward each other by constant hand pressure until the specimen broke or is stopped. The initial length is the length of the specimen between the two jaws. The final length is the length between the two jaws when the specimen broke or the test is terminated. The percent elongation is calculated by the formula $$[(\text{initial length} - \text{final length}) \div \text{initial length}] \times 100$$

ABRASION

The Abrasion test is conducted on a Teledyne Taber Abraser Model No. 503 using CS-10 grind stones with a 1 kg mass added to each grind stone arm. The rotation speed is 1.2 cycles per second. The grind stones are cleaned by letting the stones roll over sand paper for 10 cycles then the sand paper is replaced with the specimen to be evaluated. The test sample mass is determined before and after abrasion to determine the mass loss. The test material is placed onto a 4 in.×4 in.×20 gauge (101.6 mm×101.6 mm×0.95 mm) cold rolled steel panel.

REACTION PRODUCT OF EPOXY RESIN AND STEARIC ACID

To a reaction vessel equipped with a means for stirring, heating control and nitrogen purge is added 615 g (3.275 epoxy equiv.) of Epoxy Resin A and 884.3 g (3.275 equiv.) of stearic acid. After heating to 90° C., 1.2 g (0.002 mole) of Catalyst A is added. The temperature is increased to 170° C. and maintained thereat for 2 hours. The resultant solid product is hereafter designated as Reaction Product A.

EXAMPLE 1

To a reaction vessel equipped with a means for stirring, heating control and nitrogen purge is added 172 g (0.91 epoxy equiv.) of Epoxy Resin B, 2.85 g (0.0095 epoxy equiv.) of Epoxy Resin D, 87.5 g (0.767 equiv.) of bisphenol A. After heating to 90° C., 0.3 g (0.0006 mole) of Catalyst B is added. The temperature is increased to 180° C. and maintained thereat for 1.33 hours. The resultant product had an EEW of 1791. To this advanced epoxy resin is added 11 g (0.041 carboxyl equiv.) of stearic acid and the reaction temperature of 180° C. is maintained for 0.33 hours. This product had an EEW of 2018. Then, 78.1 g (0.413 epoxy equiv.) of Epoxy Resin B and 113.2 g (0.515 equiv.) of nonyl phenol is added and the temperature is increased to 180° C. and maintained thereat for 1.5 hours after which, 7.2 g (0.0036 carboxyl equiv.) of Elastomer A is added and the reaction continued for an additional 2 hours.

A portion, 21 g, of the material prepared above is mixed with 4 g of Reaction Product A at 200° C., after which 16.7 g of Filler A is added and the mixture blended. The flexibility of the resultant product is 45%.

EXAMPLE 2

To a reaction vessel equipped with a means for stirring, heating control and nitrogen purge is added 172 g (0.91 epoxy equiv.) of Epoxy Resin B, 2.85 g (0.0095 epoxy equiv.) of Epoxy Resin D, 87.5 g (0.767 equiv ) of bisphenol A. After heating to 90° C., 0.3 g (0.0006 mole) of Catalyst B is added. The temperature is increased to 180° C. and maintained thereat for 1.33 hours. The resultant product had an EEW of 1791. To this advanced epoxy resin is added 11 g (0.041 carboxyl equiv.) of stearic acid and the reaction temperature of 180° C. is maintained for 0.33 hours. The resultant product had an EEW of 2018. Then, 78.1 g (0.413 epoxy equiv.) of Epoxy Resin B and 113.2 g (0.515 equiv.) of nonyl phenol is added and the temperature is increased to 180° C. and maintained thereat for 1.5 hours after which, 7.2 g (0.0036 carboxyl equiv.) of Elastomer A is added and the reaction continued for an additional 2 hours.

A portion, 23 g, of the material prepared above is mixed with 2 g of Reaction Product A at 200° C., after which 16.7 g of Filler A is added and the mixture blended. The flexibility of the resultant product is 20%.

EXAMPLE 3

To a reaction vessel equipped with a means for stirring, heating control and nitrogen purge is added 172 g (0.91 epoxy equiv.) of Epoxy Resin B, 2.89 g (0.0096 epoxy equiv.) of Epoxy Resin D, 87.5 g (0.767 equiv.) of bisphenol A. After heating to 90° C., 0.31 g (0.0006 mole) of Catalyst B is added. The temperature is increased to 180° C. and maintained thereat for 1.12 hours. The resultant product had an EEW of 1845. To this advanced epoxy resin is added 17 g (0.063 carboxyl equiv.) of stearic acid and the reaction temperature of 180° C. is maintained for 0.37 hours. The resultant product had an EEW of 2063. Then, 78 g (0.413 epoxy equiv.) of Epoxy Resin B and 107.2 g (0.487 equiv.) of nonyl phenol is added and the temperature is increased to 180° C. and maintained thereat for 1.45 hours after which, 7.2 g (0.0036 carboxyl equiv.) of Elastomer A is added and the reaction continued for an additional 2 hours.

A portion, 23 g, of the material prepared above is mixed with 2 g of Reaction Product A at 200° C., after which 16.7 g of Filler A is added and the mixture blended. The flexibility of the resultant product is 22%.

EXAMPLE 4

To a reaction vessel equipped with a means for stirring, heating control and nitrogen purge is added 172 g (0.91 epoxy equiv.) of Epoxy Resin B, 2.89 g (0.0096 epoxy equiv.) of Epoxy Resin D, 87.5 g (0.767 equiv.) of bisphenol A. After heating to 90° C., 0.31 g (0.0006 mole) of Catalyst B is added. The temperature is increased to 180° C. and maintained thereat for 1.12 hours. The resultant product had an EEW of 1845. To this advanced epoxy resin is added 17 g (0.063 carboxyl equiv.) of stearic acid and the reaction temperature of 180° C. is maintained for 0.37 hours. The resultant product had an EEW of 2063. Then, 78 g (0.413 epoxy equiv.) of Epoxy Resin B and 107.2 g (0.487 equiv.) of nonyl phenol is added and the temperature is increased to 180° C. and maintained thereat for 1.45 hours after which, 7.2 g (0.0036 carboxyl equiv.) of Elastomer A is added and the reaction continued for an additional 2 hours.

A portion, 21 g, of the material prepared above is mixed with 4 g of Reaction Product A at 200° C., after which 16.7 g of Filler A is added and the mixture blended. The flexibility of the resultant product is 70%.

EXAMPLE 5

To a reaction vessel equipped with a means for stirring, heating control and nitrogen purge is added 430.15 g (2.281 epoxy equiv.) of Epoxy Resin C, 3.45 g (0.012 epoxy equiv.) of Epoxy Resin D, 214.4 g (1.881 equiv.) of bisphenol A. After heating to 90° C., 1.5 g (0.0028 mole) of Catalyst B is added. The temperature is increased to 185° C. and maintained thereat for 1.17 hours. The resultant product had an EEW of 1792. To this advanced epoxy resin is added 24 g (0.089 carboxyl equiv.) of stearic acid and the reaction temperature of 185° C. is maintained for 0.33 hours. The resultant product had an EEW of 2113. Then, 195.9 g (1.039 epoxy equiv.) of Epoxy Resin C and 284.2 g (1.292 equiv.) of nonyl phenol is added and the temperature is increased to 180° C. and maintained thereat for 1.53 hours after which, 16 g (0.008 carboxyl equiv.) of Elastomer A is added and the reaction continued for an additional 2.17 hours.

A portion, 20 g, of the material prepared above is mixed with 3.5 g of Reaction Product A at 200° C., after which 15.7 g of Filler A is added and the mixture blended. The flexibility of the resultant product is 50%.

EXAMPLE 6 (SOLUTION)

To a reaction vessel equipped with a means for stirring, heating control and nitrogen purge is added 490 g (2.593 epoxy equiv.) of Epoxy Resin B, 26.8 g (0.089 epoxy equiv.) of Epoxy Resin D, 236.9 g (2.078 equiv.) of bisphenol A. After heating to 90° C., 1.3 g (0.0024 mole) of Catalyst B is added. The temperature is increased to 190° C. and maintained thereat for 1.28 hours. The resultant product had an EEW of 1307. To this advanced epoxy resin is added 138.1 g (0.511 carboxyl equiv.) of stearic acid and the reaction temperature of 190° C. is maintained for 1.03 hours. The resultant product had an EEW of 8113. Then, 120.1 g (0.06 carboxyl equiv.) of Elastomer A is added and the reaction continued for an additional 2.5 hours. After cooling to 130° C., 338 g of methyl ethyl ketone is added. The resultant product contained 75% nonvolatiles.

A portion, 47.3 g, of the material prepared above is mixed with 22.5 g of acetone, 32.7 g of Filler A and 0.1 g of Thickner A.

The above coating composition is compared to a commercially available solution paint, "Fast Set" available from Sherwin-Williams, by an abrasion test. This paint from Sherwin-Williams is being employed as a highway marking paint. The results are given in the following Table I.

TABLE I

| CYCLES | EXAMPLE 6 mass loss, mg | FAST SET* Mass loss, mg |
|---|---|---|
| 0 | 0 | 0 |
| 20 | 9.1 | N.T.** |
| 40 | 13.5 | 20.0 |
| 60 | 21.7 | 30.8 |
| 80 | 24.7 | 40.9 |
| 100 | 32.4 | 51.5 |
| 120 | 41.4 | 61.9 |
| 140 | 44.9 | 71.3 |
| 160 | 51.6 | 80.6 |
| 180 | 58.0 | 90.9 |
| 200 | 64.6 | N.T. |
| 220 | 72.5 | N.T. |
| 240 | 80.1 | N.T. |

*Not an example of the present invention.
**Not tested

COMPARATIVE EXPERIMENT A

To a reaction vessel equipped with a means for stirring, heating control and nitrogen purge is added 1720.6 g (9.104 epoxy equiv.) of Epoxy Resin B, 13.8 g (0.046 epoxy equiv.) of Epoxy Resin D, 871 g (7.64 equiv.) of bisphenol A. After heating to 90° C., 3 g (0.006 mole) of Catalyst B is added. The temperature is increased to 150° C., the contents allowed to exotherm to 203° C. and then cooled to 185° C. and maintained thereat for 1.07 hour. The resultant product had an EEW of 1807. To this advanced epoxy resin is added 48.2 g (0.178 carboxyl equiv.) of stearic acid and the reaction temperature of 185° C. is maintained for 1.95 hours. The resultant product had an EEW of 2216. A portion, 289.9 g, of this material (containing 0.131 epoxy equiv.) is placed into another reaction vessel containing 84.7 g (0.448 epoxy equiv.) of Epoxy Resin B and 125.5 g (0.57 equiv.) of nonyl phenol. The temperature is increased to 180° C. and maintained thereat for 1.5 hours, after which 7.6 g (0.004 carboxyl equiv.) of Elastomer A is added and the reaction continued for an additional 2.33 hours.

A portion, 23 g, of the material prepared above is mixed with 2 g of Reaction Product A at 200° C., after which 16.7 g of Filler A is added and the mixture blended. The flexibility of the resultant product is <1%.

COMPARATIVE EXPERIMENT B

To a reaction vessel equipped with a means for stirring, heating control and nitrogen purge is added 1720.6 g (9.104 epoxy equiv.) of Epoxy Resin B, 13.8 g (0.046 epoxy equiv.) of Epoxy Resin D, 871 g (7.64 equiv.) of bisphenol A. After heating to 90° C., 3 g (0.006 mole) of Catalyst B is added. The temperature is increased to 150° C., the contents allowed to exotherm to 205° C. and then cooled to 185° C. and maintained thereat for 1 hour. The resultant product had an EEW of 1770. To this advanced epoxy resin is added 24.2 g (0.089 carboxyl equiv.) of stearic acid and the reaction temperature of 185° C. is maintained for 1.5 hours. The resultant product had an EEW of 2018. A portion, 280 g, of this material (containing 0.139 epoxy equiv.) is placed into another reaction vessel containing 81.9 g (0.433 epoxy equiv.) of Epoxy Resin B and 124.3 g (0.565 equiv.) of nonyl phenol. When the temperature reached 120° C., 0.5 g (0.0009 mole) of Catalyst B is added. The temperature is increased to 180° C. and maintained thereat for 1.83 hours, after which 7.5 g (0.004 carboxyl equiv.) of Elastomer A is added and the reaction continued for an additional 1.5 hours.

A portion, 21 g, of the material prepared above is mixed with 4 g of Reaction Product A at 200° C., after which 16.7 g of Filler A is added and the mixture blended. The flexibility of the resultant product is 2%.

COMPARATIVE EXPERIMENT C

To a reaction vessel equipped with a means for stirring, heating control and nitrogen purge is added 172 g (0.91 epoxy equiv.) of Epoxy Resin B, 2.9 g (0.0097 epoxy equiv.) of Epoxy Resin D, 87.5 g (0.767 equiv.) of bisphenol A. After heating to 90° C., 0.31 g (0.0006 mole) of Catalyst B is added. The temperature is increased to 180° C. and maintained thereat for 1.02 hours. The resultant product had an EEW of 1777. To this advanced epoxy resin is added 78.1 g (0.413 epoxy equiv.) of Epoxy Resin B and 7.2 g (0.0036 carboxyl equiv.) of Elastomer A is added and the reaction continued for an additional 2 hours.

COMPARATIVE EXPERIMENT D

To a reaction vessel equipped with a means for stirring, heating control and nitrogen purge is added 1720.6 g (9.104 epoxy equiv.) of Epoxy Resin B, 13.8 g (0.046 epoxy equiv.) of Epoxy Resin D, 871 g (7.64 equiv.) of bisphenol A. After heating to 90° C., 3 g (0.006 mole) of Catalyst B is added. The temperature is increased to 150° C., the contents allowed to exotherm to 203° C. and then cooled to 185° C. and maintained thereat for 1.07 hours. The resultant product had an EEW of 1807. To this advanced epoxy resin is added 48.2 g (0.178 carboxyl equiv.) of stearic acid and the reaction temperature of 185° C. is maintained for 1.95 hours. This product had an EEW of 2216. A portion, 289.9 g, of this material (containing 0.131 epoxy equiv.) is placed into another reaction vessel containing 84.7 g (0.448 epoxy equiv.) of Epoxy Resin B and 125.5 g (0.57 equiv.) of nonyl phenol. After mixing, at a temperature of 98° C., 0.5 g (0.0009 mole) of catalyst B is added. The temperature is increased to 180° C. and maintained thereat for 1.5 hours, after which 7.6 g (0.004 carboxyl equiv.) of Elastomer A is added and the reaction continued for an additional 2.33 hours.

A portion, 21 g, of the material prepared above is mixed with 4 g of Reaction Product A at 200° C., after which 16.7 g of Filler A is added and the mixture blended. The flexibility of the resultant product is 7%.

COMPARATIVE EXPERIMENT E

To a reaction vessel equipped with a means for stirring, heating control and nitrogen purge is added 1720.6 g (9.104 epoxy equiv.) of Epoxy Resin B, 13.8 g (0.046 epoxy equiv.) of Epoxy Resin D, 871 g (7.64 equiv.) of bisphenol A. After heating to 90° C., 3 g (0.006 mole) of Catalyst B is added. The temperature is increased to 150° C., the contents allowed to exotherm to 205° C. and then cooled to 185° C. and maintained thereat for 1 hour. The resultant product had an EEW of 1770. To this advanced epoxy resin is added 24.2 g (0.089 carboxyl equiv.) of stearic acid and the reaction temperature of 185° C. is maintained for 1.5 hours. The resultant product had an EEW of 2018. A portion, 280 g, of this material (containing 0.139 epoxy equiv.) is placed into another reaction vessel containing 82.2 g (0.435 epoxy equiv.) of Epoxy Resin B and 123.6 g (0.562 equiv.) of nonyl phenol. After mixing, and increasing the temperature to 145° C., 0.5 g (0.0009 mole) of catalyst B is added. The temperature is increased to 180° C. and maintained thereat for 1.58 hours, after which 15.3 g (0.0077 carboxyl equiv.) of Elastomer A is added and the reaction continued for an additional 2 hours.

A portion, 21.5 g, of the material prepared above is mixed with 3.5 g of Reaction Product A at 200° C., after which 16.7 g of Filler A is added and the mixture blended. The flexibility of the resultant product is 5%.

COMPARATIVE EXPERIMENT F

To a reaction vessel equipped with a means for stirring, heating control and nitrogen purge is added 172 g (0.91 epoxy equiv.) of Epoxy Resin B, 2.84 g (0.0095 epoxy equiv.) of Epoxy Resin D, 87.5 g (0.767 equiv.) of bisphenol A. After heating to 90° C., 0.3 g (0.0006 mole) of Catalyst B is added. The temperature is increased to 180° C. and maintained thereat for 1.33 hours. The resultant product had an EEW of 1720. To this advanced epoxy resin is added 7.2 g (0.027 carboxyl equiv.) of stearic acid and the reaction temperature of 180° C. is maintained for 0.33 hours. The resultant product had an EEW of 2131. Then, 78.4 g (0.415 epoxy equiv.) of Epoxy Resin B and 117.6 g (0.535 equiv.) of nonyl phenol is added and the temperature is increased to 180° C. and maintained thereat for 1.5 hours after which, 7.2 g (0.0036 carboxyl equiv.) of Elastomer A is added and the reaction continued for an additional 2.17 hours.

A portion, 23.5 g, of the material prepared above is mixed with 1.5 g of Reaction Product A at 200° C., after which 16.7 g of Filler A is added and the mixture blended. The flexibility of the resultant product is 4%.

EXAMPLE 7

The thermal stability is determined for Example 1 and Comparative Experiment C. The stability is determined by mixing the resins to be compared with a second resin and determining the thermal stability on the resin blend.

THERMAL STABILITY TEST

The thermal stability test is run using a Brookfield Thermosel set at 232° C. The resin mixture (9 g) ws placed into the Thermosel cup which is then placed into the viscometer oven. When the resin mixture is fluid, the spindle (No. 21) is lowered into the resin and the viscometer motor started. The viscosity is determined and recorded as the initial viscosity. The resin mixture is left in the viscosity oven for 4 hours and the viscosity measured again and recorded as the final viscosity. The results are given in Table II.

TABLE II

| SAMPLE NUMBER | RESIN 1 Type/ grams | RESIN 2 Type/ grams | INITIAL VISCOSITY cps/Pa.s | FINAL VISCOSITY cps/Pa.s |
| --- | --- | --- | --- | --- |
| A* | Comp. Exp. C/23.5 | Epoxy Resin B/1.5 | 940/0.94 | 1625/1.625 |
| B | Example 1/21 | Reaction Product A/4 | 196/0.196 | 201/0.201 |

*Not an example of the present invention.

We claim:
1. A mixture comprising
(I) from about 70 to about 95 percent by weight based upon the combined weight of components (I) and (II) of a thermally stable, flexible thermoplastic epoxy resin resulting from
 (A) reacting, in the presence of an effective quantity of a catalyst for effecting the reaction between a vicinal epoxide group and an aromatic hydroxyl group, a mixture comprising
  (1) at least one aromatic based epoxy resin having an average of more than 1 but not more than about 2.1 vicinal epoxy groups per molecule;
  (2) at least one aliphatic based epoxy resin having an average of more than 1 but not more than about 2.1 vicinal epoxy groups per molecule;
  (3) at least one material having an average of more than 1 but not more than about 2 phenolic hydroxyl groups per molecule;
 wherein components (1) and (2) are employed in quantities such that from about 90 to about 99.6 percent of the vicinal epoxy groups are contributed by the aromatic based epoxy resin and from about 10 to about 0.4 percent of the vicinal epoxy groups are contributed by the aliphatic based epoxy resin; and wherein component (3) is employed in quantities such that the resultant product has an epoxide equivalent weight of from about 1600 to about 2500, calculated on the basis that the aromatic groups contained therein are free of substituent groups even if they do in fact contain substituent groups;
 (B) reacting, in the presence of an effective quantity of a catalyst for effecting the reaction between a vicinal epoxide group and a carboxyl group, the product resulting from (A) with
  (4) at least one aromatic or aliphatic monocarboxylic acid in a quantity which provides a ratio of moles of component (4) per epoxide group contained in component (1) of from about 0.033:1 to about 0.2:1;

(C) reacting, in the presence of an effective quantity of a catalyst for effecting the reaction between a vicinal epoxide group and a group selected from —OH, —SH, —COOH or —CO—O—CO— groups, the product resulting from (B) with a mixture comprising (5) an aromatic based epoxy resin having an average of more than 1 but not more than about 2.1 vicinal epoxy groups per molecule and an epoxide equivalent weight of not greater than about 225 calculated on the basis of the aromatic groups being free of substituent groups whether or not they do in fact contain substituent groups; and (6) a material having only one group per molecule which is reactive with a vicinal epoxy group selected from —OH, —SH, —COOH or —CO—O—CO— groups;

wherein component (5) is employed in an amount which provides a ratio of vicinal epoxy groups from component (5) to the combined amount of epoxy groups contained in components (1) and (2) of from about 0.42:1 to about 0.48:1; and component (6) is employed in an amount which provides from about 0.87 to about 1 group reactive with a vicinal epoxy group per combined vicinal epoxy group contained in the product from (B) and component (5); and (D) reacting, in the presence of an effective quantity of a catalyst for effecting the reaction between a vicinal epoxide group and a carboxyl group, the product resulting from (C) with (7) a carboxyl terminated elastomer in an amount which provides a ratio of carboxyl groups per vicinal epoxy group contained in components (1) and (2) of from about 0.0028:1 to about 0.03:1;

with the proviso that the combined quantity of groups reactive with an epoxide group from components (3), (4), (6) and (7) cannot exceed the combined quantity of epoxide groups contained in components (1), (2) and (5) and (II) from about 5 to about 30 percent by weight based upon the combined weight of components (I) and (II) of the product resulting from reacting, in the presence of an effective quantity of a catalyst for effecting the reaction between a vicinal epoxy group and a group selected from —OH, —SH, —COOH or —CO—O—CO— groups, (8) at least one aromatic based epoxy resin having an average of more than 1 but not more than about 2.1 vicinal epoxy groups per molecule and an epoxide equivalent weight of not greater than about 225, calculated on the basis of the aromatic groups being free of substituent groups whether or not they do in fact contain substituent groups; and (9) at least one material having only one group per molecule which is reactive with a vicinal epoxy group selected from —OH, —SH, —COOH or —CO—O—CO— groups; and wherein components (8) and (9) are employed in an amount which provides a ratio of groups reactive with a vicinal epoxy group to vicinal epoxy group of from about 0.9:1 to about 1.1:1.

2. A mixture of claim 1 wherein (i) component (I) is employed in an amount of from about 80 to about 95 percent by weight based upon the combined weight of components (I) and (II);

(ii) component (II) is employed in an amount of from about 5 to about 20 percent by weight based upon the combined weight of components (I) and (II);

(iii) components (1) and (2) are employed in quantities such that from about 94 to about 99.6 percent of the vicinal epoxy groups are contributed by the aromatic based epoxy resin and from about 6 to about 0.4, percent of the vicinal epoxy groups are contributed by the aliphatic based epoxy resin;

(iv) components (1), (2) and (3) are employed in quantities such that the resultant product has an epoxide equivalent weight of from about 1650 to about 2100 calculated on the basis of the aromatic groups being free of substituent groups whether or not they do in fact contain substituent groups;

(v) component (4) is employed in a quantity which provides a ratio of moles of component (4) per epoxide group contained in component (1) of from about 0.037:1 to about 0.1:1;

(vi) component (5) is employed in an amount which provides a ratio of vicinal epoxy groups from component (5) to vicinal epoxy groups from components (1) and (2) of from about 0.43:1 to about 0.47:1;

(vii) component (6) is employed in an amount which provides from about 0.96 to about 1 group reactive with a vicinal epoxy group per combined vicinal epoxy group contained in the product from (B) and component (5);

(viii) component (7) is employed in an amount which provides a ratio of carboxyl groups per vicinal epoxy group contained in components (1) and (2) of from about 0.003:1 to about 0.009:1; and (ix) components (8) and (9) are employed in an amount which provides a ratio of groups reactive with a vicinal epoxy group to vicinal epoxy group of from about 0.94:1 to about 1:1.

3. A mixture of claim 2 wherein (i) component (I) is employed in an amount of from about 84 to about 94 percent by weight based upon the combined weight of components (I) and (II);

(ii) component (II) is employed in an amount of from about 6 to about 16 percent by weight based upon the combined weight of components (I) and (II);

(iii) components (1) and (2) are employed in quantities such that from about 96 to about 99.6 percent of the vicinal epoxy groups are contributed by the aromatic based epoxy resin and from about 4 to about 0.4, percent of the vicinal epoxy groups are contributed by the aliphatic based epoxy resin;

(iv) components (1), (2) and (3) are employed in quantities such that the resultant product has an epoxide equivalent weight of from about 1700 to about 1900 calculated on the basis of the aromatic groups being free of substituent groups whether or not they do in fact contain substituent groups;

(v) component (4) is employed in a quantity which provides a ratio of moles of component (4) per epoxide group contained in component (1) of from about 0.038:1 to about 0.07:1;

(vi) component (5) is employed in an amount which provides a ratio of vicinal epoxy groups from component (5) to vicinal epoxy groups from components (1) and (2) of from about 0.44:1 to about 0.46:1;

(vii) component (6) is employed in an amount which provides from about 0.98 to about 1 group reactive with a vicinal epoxy group per combined vicinal epoxy group contained in the product from (B) and component (5);

(viii) component (7) is employed in an amount which provides a ratio of carboxyl groups per vicinal epoxy group contained in components (1) and (2) of from about 0.0035:1 to about 0.008:1; and (ix) components (8) and (9) are employed in an amount which provides a ratio of groups reactive with a vicinal epoxy group to vicinal epoxy group of from about 0.96:1 to about 1:1.

4. A mixture of claims 1, 2 or 3 wherein (i) component (1) is a diglycidyl ether of a bisphenol;
(ii) component (2) is a diglycidyl ether of a polyoxyalkylene glycol;
(iii) component (3) is a bisphenol;
(iv) component (4) is an aliphatic monocarboxylic acid;
(v) component (5) is a diglycidyl ether of a bisphenol;
(vi) component (6) is an alkyl phenol;
(vii) component (7) is a butadiene-acrylonitrile copolymer;
(viii) component (8) is a diglycidyl ether of a bisphenol; and
(ix) component (9) is an aliphatic monocarboxylic acid.

5. A mixture of claim 4 wherein (i) component (1) is a diglycidyl ether of bisphenol A;
(ii) component (2) is a diglycidyl ether of a polyoxypropylene glycol;
(iii) component (3) is bisphenol A;
(iv) component (4) is stearic acid;
(v) component (5) is a diglycidyl ether of bisphenol A;
(vi) component (6) is nonyl phenol;
(vii) component (7) is a carboxyl-containing copolymer containing from about 20 to about 25 percent by weight acrylonitrile and from about 75 to about 80 percent by weight butadiene based upon the combined weight of acrylonitrile and butadiene and a carboxyl content of from about 1.7 to about 3 percent by weight based upon the total weight of the carboxyl-containing polymer;
(viii) component (8) is a diglycidyl ether of bisphenol A; and
(ix) component (9) is stearic acid.

6. A paint formulation comprising a mixture of claim 1, 2 or 3 and (a) at least one pigment or dye; (b) at least one filler material; (c) at least one light reflective material; or (d) any combination of two or more memers selected from (a), (b) or (c).

7. A paint formulation of claim 6 wherein both components (a) and (c) are present.

8. A paint formulation of claim 7 wherein component (c) is glass beads.

9. A paint formulation comprising a mixture of claim 4 and (a) at least one pigment or dye; (b) at least one filler material; (c) at least one light reflective material; or (d) any combination of two or more members selected from (a), (b) or (c).

10. A paint formulation of claim 9 wherein both components (a) and (c) are present.

11. A paint formulation of claim 10 wherein component (c) is glass beads.

12. A paint formulation comprising a mixture of claim 5 and (a) at least one pigment or dye; (b) at least one filler material; (c) at least one light reflective material; or (d) any combination of two or more members selected from (a), (b) or (c).

13. A paint formulation of claim 12 wherein both components (a) and (c) are present.

14. A paint formulation of claim 13 wherein component (c) is glass beads.

15. A paint formulation comprising the formulation of claim 6 and one or more inert solvents.

16. A paint formulation of claim 15 wherein said solvent is acetone, methyl ethyl ketone, methyl isobutyl ketone, cyclohexane, methylene chloride, or a combination thereof.

17. A paint formulation comprising the formulation of claim 7 and one or more inert solvents.

18. A paint formulation of claim 17 wherein said solvent is acetone, methyl ethyl ketone, methyl isobutyl ketone, cyclohexane, methylene chloride, or a combination thereof.

19. A paint formulation comprising the formulation of claim 8 and one or more inert solvents.

20. A paint formulation of claim 19 wherein said solvent is acetone, methyl ethyl ketone, methyl iosbutyl ketone, cyclohexane, methylene chloride, or a combination thereof.

21. A paint formulation comprising the formulation of claim 9 and one or more inert solvents.

22. A paint formulation of claim 21 wherein said solvent is acetone, methyl ethyl ketone, methyl isobutyl ketone, cyclohexane, methylene chloride, or a combination thereof.

23. A paint formulation comprising the formulation of claim 10 and one or more inert solvents.

24. A paint formulation of claim 23 wherein said solvent is acetone, methyl ethyl ketone, methyl isobutyl ketone, cyclohexane, methylene chloride, or a combination thereof.

25. A paint formulation comprising the formulation of claim 11 and one or more inert solvents.

26. A paint formulation of claim 25 wherein said solvent is acetone, methyl ethyl ketone, methyl isobutyl ketone, cyclohexane, methylene chloride, or a combination thereof.

27. A paint formulation comprising the formulation of claim 12 and one or more inert solvents.

28. A paint formulation of claim 27 wherein said solvent is acetone, methyl ethyl ketone, methyl isobutyl ketone, cyclohexane, methylene chloride, or a combination thereof.

29. A paint formulation comprising the formulation of claim 13 and one or more inert solvents.

30. A paint formulation of claim 29 wherein said solvent is acetone, methyl ethyl ketone, methyl isobutyl ketone, cyclohexane, methylene chloride, or a combination thereof.

31. A paint formulation comprising the formulation of claim 14 and one or more inert solvents.

32. A paint formulation of claim 31 wherein said solvent is acetone, methyl ethyl ketone, methyl isobutyl ketone, cyclohexane, methylene chloride, or a combination thereof.

33. A process for preparing a thermally stable, flexible thermoplastic epoxy resin which comprises mixing (I) from about 70 to about 95 percent by weight based upon the combined weight of components (I) and (II) of a thermally stable, flexible thermoplastic epoxy resin resulting from (A) reacting, in the presence of an effective quantity of a catalyst for effecting the reaction between a vicinal epoxide group and an aromatic hydroxyl group, a mixture comprising (1) at least one aromatic based epoxy resin having an average of more than 1 but not more than about 2.1 vicinal epoxy groups per molecule;

(2) at least one aliphatic based epoxy resin having an average of more than 1 but not more than about 2.1 vicinal epoxy groups per molecule;

(3) at least one material having an average of more than 1 but not more than about 2 phenolic hydroxyl groups per molecule;

wherein components (1) and (2) are employed in quantities such that from about 90 to about 99.6 percent of the vicinal epoxy groups are contributed by the aromatic based epoxy resin and from about 10 to about 0.4 percent of the vicinal epoxy groups are contributed by the aliphatic based epoxy resin; and wherein component (3) is employed in quantities such that the resultant product has an epoxide equivalent weight of from about 1600 to about 2500, calculated on the basis that the aromatic groups contained therein are free of substituent groups even if they do in fact contain substituent groups;

(B) reacting, in the presence of an effective quantity of a catalyst for effecting the reaction between a vicinal epoxide group and a carboxyl group, the product resulting from (A) with (4) at least one aromatic or aliphatic monocarboxylic acid in a quantity which provides a ratio of moles of component (4) per epoxide group contained in component (1) of from about 0.033:1 to about 0.2:1;

(C) reacting, in the presence of an effective quantity of a catalyst for effecting the reaction between a vicinal epoxide group and a group selected from —OH, —SH, —COOH or —CO—O—CO— groups, the product resulting from (B) with a mixture comprising (5) an aromatic based epoxy resin having an average of more than 1 but not more than about 2.1 vicinal epoxy groups per molecule and an epoxide equivalent weight of not greater than about 225 calculated on the basis of the aromatic groups being free of substituent groups whether or not they do in fact contain substituent groups; and (6) a material having only one group per molecule which is reactive with a vicinal epoxy group selected from —OH, —SH, —COOH or —CO—O—CO— groups;

wherein component (5) is employed in an amount which provides a ratio of vicinal epoxy groups from component (5) to the combined amount epoxy groups contained in components (1) and (2) of from about 0.42:1 to about 0.48:1; and component (6) is employed in an amount which provides from about 0.87 to about 1 group reactive with a vicinal epoxy group per combined vicinal epoxy group contained in the product from (B) and component (5); and (D) reacting, in the presence of an effective quantity of a catalyst for effecting the reaction between a vicinal epoxide group and a carboxyl group, the product resulting from (C) with (7) a carboxyl terminated elastomer in an amount which provides a ratio of carboxyl groups per vicinal epoxy group contained in components (1) and (2) of from about 0.0028:1 to about 0.03:1;

with the proviso that the combined quantity of groups reactive with an epoxide group from components (3), (4), (6) and (7) cannot exceed the combined quantity of epoxide groups contained in components (1), (2) and (5) and (II) from about 5 to about 30 percent by weight based upon the combined weight of components (I) and (II) of the product resulting from reacting, in the presence of an effective quantity of a catalyst for effecting the reaction between a vicinal epoxy group and a group selected from —OH, —SH, —COOH or —CO—O—CO— groups, (8) at least one aromatic based epoxy resin having an average of more than 1 but not more than about 2.1 vicinal epoxy groups per molecule and an epoxide equivalent weight of not greater than about 225, calculated on the basis of the aromatic groups being free of substituent groups whether or not they do in fact contain substituent groups; and (9) at least one material having only one group per molecule which is reactive with a vicinal epoxy group selected from —OH, —SH, —COOH or —CO—O—CO— groups; and wherein components (8) and (9) are employed in an amount which provides a ratio of groups reactive with a vicinal epoxy group to vicinal epoxy group of from about 0.9:1 to about 1.1:1.

* * * * *